(12) United States Patent
Krampotich (10) Patent No.: US 7,437,049 B2
(45) Date of Patent: Oct. 14, 2008

(54) CABLE MANAGEMENT DRAWER WITH ACCESS PANEL

(75) Inventor: Dennis Krampotich, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/546,538

(22) Filed: Oct. 10, 2006

(65) Prior Publication Data

US 2008/0085093 A1 Apr. 10, 2008

(51) Int. Cl.
*G02B 6/00* (2006.01)

(52) U.S. Cl. ........................................ 385/135; 385/134
(58) Field of Classification Search .................. 385/135
See application file for complete search history.

(56) References Cited

U.S. PATENT DOCUMENTS

| | | | |
|---|---|---|---|
| 5,071,211 A | 12/1991 | Debortoli et al. | |
| 5,167,001 A | 11/1992 | Debortoli et al. | |
| 5,490,229 A * | 2/1996 | Ghandeharizadeh et al. | 385/135 |
| 5,497,444 A * | 3/1996 | Wheeler | 385/135 |
| 5,717,810 A * | 2/1998 | Wheeler | 385/135 |
| 6,301,424 B1 | 10/2001 | Hwang | |
| 6,438,310 B1 | 8/2002 | Lance et al. | |
| 6,504,988 B1 | 1/2003 | Trebesch et al. | |
| RE38,311 E * | 11/2003 | Wheeler | 385/135 |
| 6,792,190 B2 | 9/2004 | Xin et al. | |
| 6,944,389 B2 * | 9/2005 | Giraud et al. | 385/135 |
| 7,031,588 B2 * | 4/2006 | Cowley et al. | 385/135 |
| 7,079,744 B2 | 7/2006 | Douglas et al. | |
| 2002/0117942 A1 | 8/2002 | Audibert et al. | |
| 2005/0025444 A1 | 2/2005 | Barnes et al. | |
| 2006/0018622 A1* | 1/2006 | Caveney et al. | 385/135 |
| 2007/0031099 A1 | 2/2007 | Herzog et al. | |

OTHER PUBLICATIONS

U.S. Appl. No. 11/543,457, filed Oct. 4, 2006, inventor Barnes; *Slide Arrangement For Cable Drawer*.

* cited by examiner

*Primary Examiner*—Frank G Font
*Assistant Examiner*—Ryan Lepisto
(74) *Attorney, Agent, or Firm*—Merchant & Gould P.C.

(57) ABSTRACT

A cable management panel including a sliding drawer. The drawer including a bottom tray that pivots to provide access to cable management devices mounted on the tray. The drawer including a connection arrangement that locks the tray in both of a non-pivoted position and a pivoted position.

36 Claims, 10 Drawing Sheets

CABLE MANAGEMENT DRAWER WITH ACCESS PANEL

TECHNICAL FIELD

This disclosure relates generally to methods and devices for managing telecommunication cables. More particularly, this disclosure relates to a cable management panel having a sliding drawer for managing fiber optic cables.

BACKGROUND

Cable management arrangements for cable termination, splice, and storage come in many forms. One type of cable management arrangement used in the telecommunications industry includes sliding drawers installed on telecommunication equipment racks. The drawers provide organized, high-density, cable termination, splice, and storage in telecommunication infrastructures that often have limited space.

To accommodate the massive scale of telecommunication infrastructures, and to maximize use of limited space, the drawers are sometimes stacked or mounted at heights above a comfortable working height. That is, the drawers can be stacked such that it is difficult to reach or access the interior of some drawers. Access is necessary in both the original installation of cables and subsequent adaptation or maintenance of the cables. There is a continued need in the art for better cable management devices and arrangements to address concerns regarding the ease of use of such cable management arrangements.

SUMMARY

The present disclosure relates to a cable management panel having a chassis and a slidable drawer. The slidable drawer has a tray on which cable management devices are mounted. The tray is pivotally mounted to a drawer frame of the drawer. Access to the cable management devices is provided by sliding the drawer out from the chassis, and pivoting the tray from a non-pivoted position to a pivoted position. The tray locks in place in both the non-pivoted position and the pivoted position.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
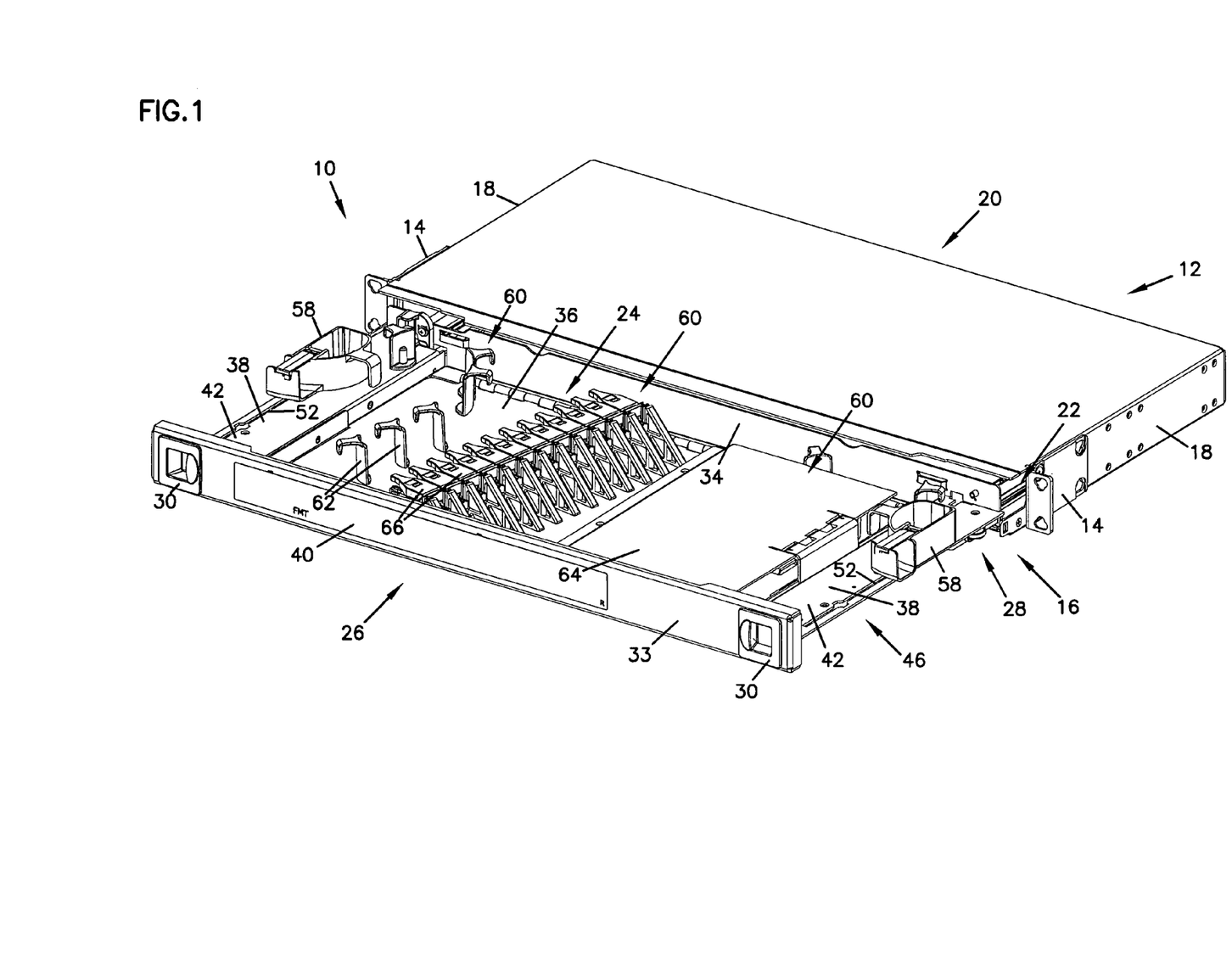
FIG. 1 is a front perspective view of one embodiment of a cable management panel according to the principles of the present disclosure, having a drawer that is shown in an open position.

Referring to FIG. 1, a cable management panel or module 10 according to the present invention is shown. The panel 10 includes a frame or chassis 12 having mounting brackets 14. The mounting brackets 14 are used to mount the panel 10 to a telecommunication structure, such as a telecommunication rack or frame. The cable management panel 10 can also be configured for mounting within a cabinet or enclosure, for example. Details of an example mounting bracket arrangement that can be used in accordance with the principles disclosed are described in U.S. Publication No. 2005/0025444, the disclosure of which is incorporated herein by reference.

Figure 2:
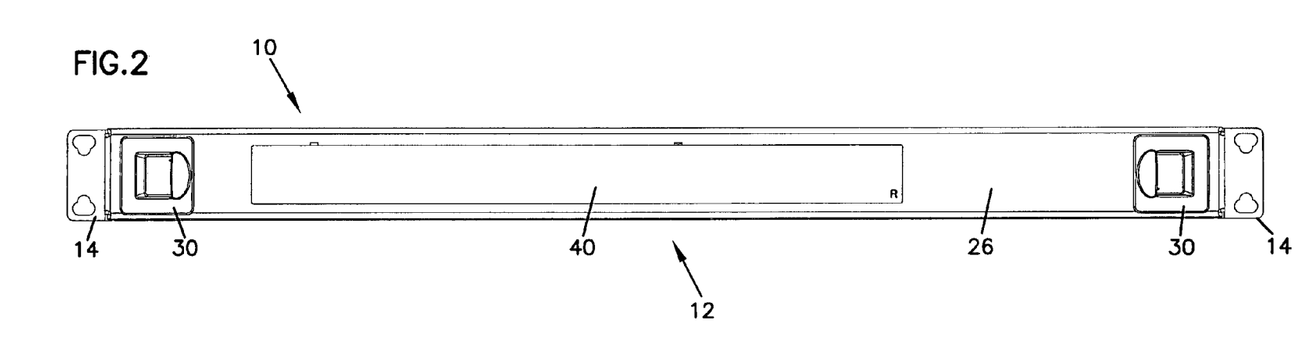
FIG. 2 is a front elevation view of the cable management panel of FIG. 1, shown with the drawer in a closed position.

The chassis 12 of the cable management panel 10 has a front 16, opposite sides 18, and a rear 20. The sides 18 define cable access openings 22 (see also FIG. 3) through which cables are routed into or out from the chassis 12. The chassis 12 further includes a drawer 26 that slides between an open position (FIGS. 1 and 3) and a closed position (FIG. 2). In the closed position, cables contained within an interior region 24 of the drawer 26 are enclosed and protected. In the open position, the cables can be accessed for maintenance purposes, for example.

Referring still to FIG. 1, the drawer 26 of the cable management panel 10 includes a front 33, a rear 34, a bottom tray (e.g., base plate or panel) 36, and sides 38. The sides 38 and rear 34 of the drawer generally define a drawer frame 46 to which the bottom tray 36 is attached. The front 33 of the drawer 26 is defined by an upright front drawer panel 40 that is attached to the tray 36. The upright front drawer panel 40 encloses the interior region 24 of the drawer 26 when the drawer is in the closed position. While the sides 38 of the drawer 26 are open, the sides 18 of the chassis are constructed to enclose the interior region 24 of the drawer 26 when the drawer is in the closed position.

The open sides 38 of the drawer 26 are provided to allow for cable entry and exit, and prevent cable damage during sliding movement of the drawer 26. Radius limiters 58 are located at the sides 38 of the drawer 26 for managing the exiting and entering cables during sliding movement of the drawer. The radius limiters 58 also act as guides for cables passing through the access openings 22, and protect the cables from damage by limiting cable bending beyond a minimum bend radius.

The open sides 38 of the drawer 26 are generally defined by horizontal side plates 42. The side plates 42 include longitudinal slots 52. The longitudinal slots 52 cooperate with the radius limiters 58 on each side of drawer 26. Preferably, the radius limiters 58 are moveably mounted relative to the chassis 12 and drawer 26. In one embodiment, movement of the radius limiters 58 is controlled in a synchronized manner relative to the movement of the drawer 26. Further details of example drawers having radius limiters, and drawers having radius limiters with synchronized movement are described in U.S. Pat. Nos. 6,438,310; 6,504,988; and 7,079,744; the disclosures of which are each incorporated herein by reference.

The drawer 26 in the illustrated embodiment includes a variety of cable management elements 60 (e.g., cable management components or structures and distribution components or devices). The interior region 24 of the drawer 26 is sized for receiving the cable management elements 60. When the drawer 26 is in the closed position, the cables and cable management devices or elements 60 in the interior region 24 are protected.

FIG. 1 illustrates one tray embodiment having various types of cable management elements 60. The elements 60 include cable retainers 62, a splice tray enclosure 64 housing splice trays, and adapters or connector holders 66 at which fiber optic connectors are mounted or located. As can be understood, the drawer 26 can be customized to include numerous forms of cable management elements 60 to accommodate the particular needs of the user. In addition to those elements 60 shown, examples of other cable management elements include other constructions, assemblies, and devices for storing the cables or connecting the cables to other cables; and/or other fiber optic devices, such as attenuators, couplers, switches, wave divisions multiplexers (WDMs), and splitters/combiners. Each of the references previously incorporated herein by reference, as well as U.S. application Ser. No. 11/196,523, which is incorporated herein by reference, describe other examples of customized element arrangements that can be provided in accordance with the principles disclosed.

Figure 6:
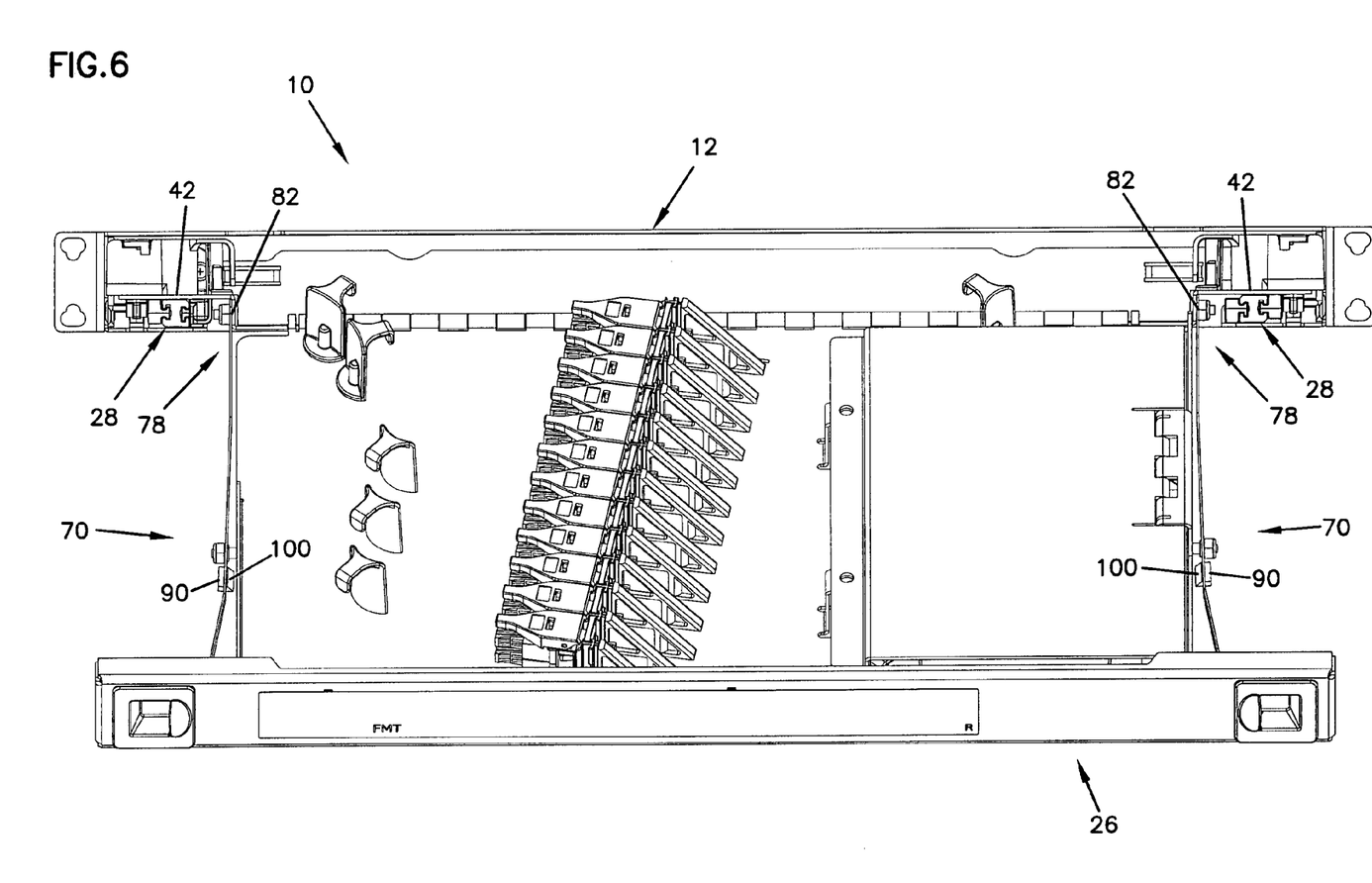
FIG. 6 is a front elevation view of the cable management panel of FIG. 5.
Figure 9:
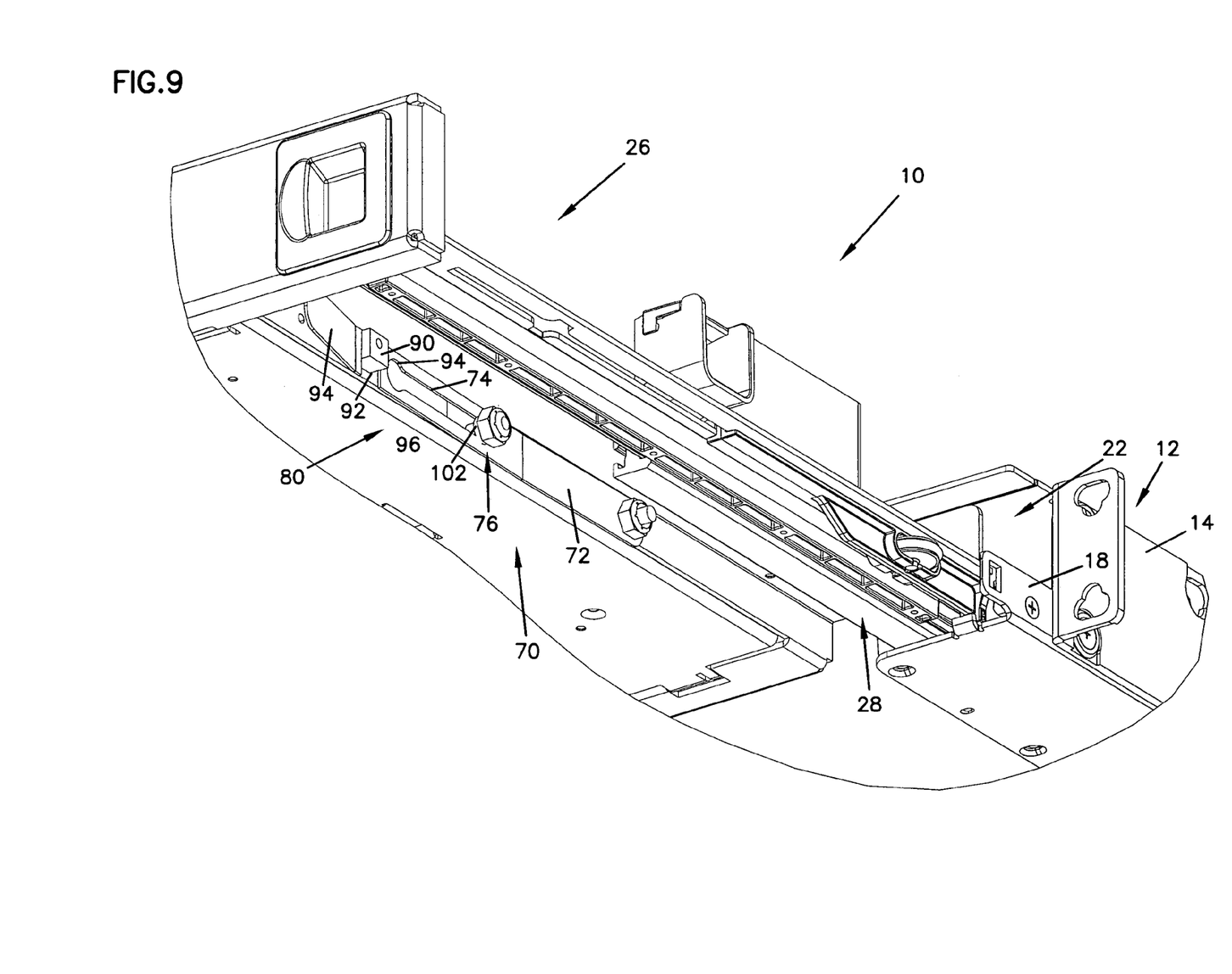
FIG. 9 is an enlarged perspective view of a portion of the cable management panel of FIG. 1.

The drawer 26 of the present cable management panel 10 slides relative to the chassis 12 via two drawer slide assemblies 28 (see also FIGS. 6 and 9). The drawer slide assemblies 28 are located adjacent to the opposite sides 18 of the chassis 12. Latches 30 are provided adjacent to both sides 38 of the drawer 26. The latches 30 secure the drawer 26 in the closed position by engaging a side hole 32 (FIG. 3) located at the side 18 of the chassis 12.

In the illustrated embodiment, the two drawer slide assemblies 28 each include three slide rails. Further details of one type of slide assembly that can be used are described in U.S. Publication No. 2005/0025444; previously incorporated herein by reference. Other slide assemblies that can be used are described in U.S. application Ser. No. 11/543,457 having U.S. Publication No. 2008/0085092 (not yet known); which application is also incorporated herein by reference.

The illustrated drawer slide assemblies 28 each include a stop arrangement (not shown). The stop arrangement limits the opening sliding movement of the drawer 26 beyond the open position to prevent inadvertent separation from the chassis 12. In the illustrated embodiment, the stop arrangement is an integral function of the drawer slide assembly 28. Further details of such an arrangement are described in U.S. Publication No. 2005/0025444; previously incorporated herein by reference.

Figure 3:
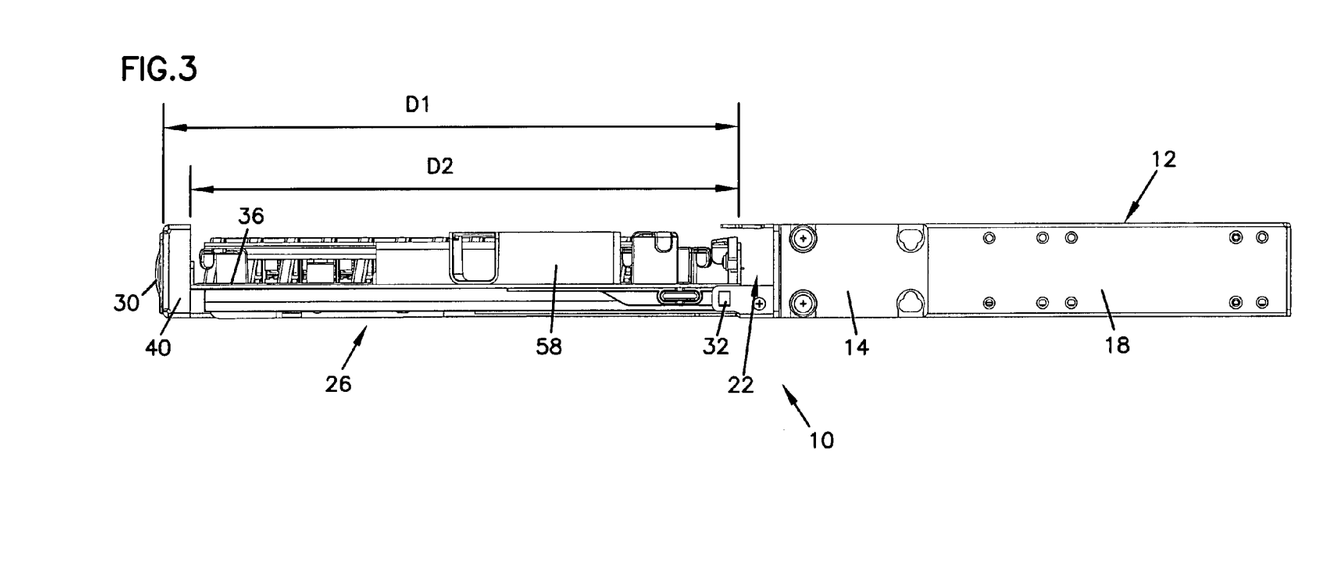
FIG. 3 is a side elevation view of the cable management panel of FIG. 1.

Referring now to FIGS. 1 and 3, the drawer 26 has a drawer depth D1 (FIG. 3) that extends between the front 33 (FIG. 1) of the drawer and the rear 34 of the drawer. The tray 36 has a tray depth D2 (FIG. 3) that extends a majority of the depth D1 of the drawer 26. In the illustrated embodiment, the depth D2 of the tray extends a substantial majority of the depth D1 of the drawer 26.

Figure 4:
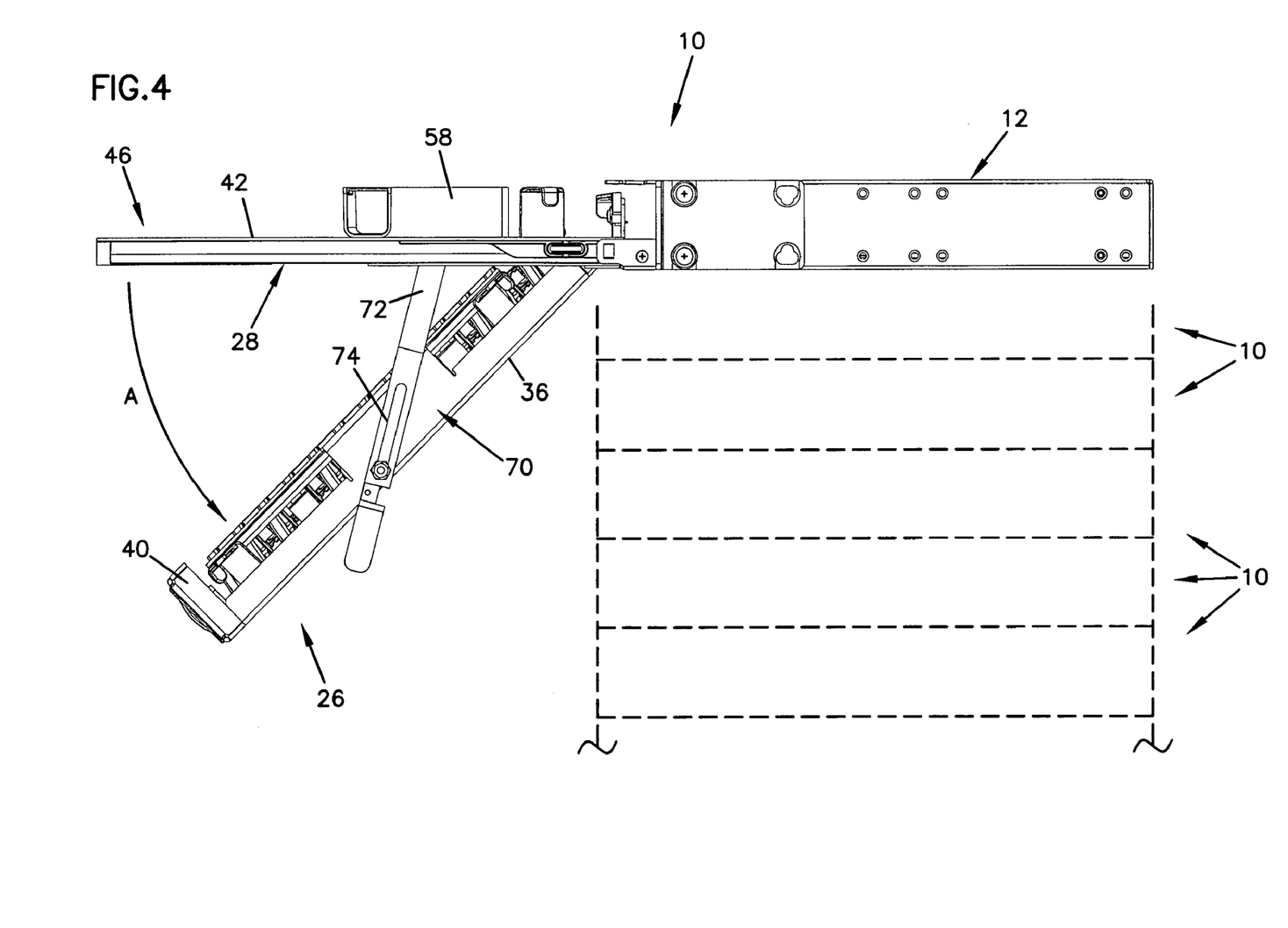
FIG. 4 is a side elevation view of the cable management panel of FIG. 3; shown with a tray of the drawer in a pivoted position.

In the present cable management panel 10, the tray 36 can be selectively pivoted from a first planar orientation, as shown in FIG. 1, to a second non-planar orientation, as shown in FIG. 4. The second "non-planar" orientation is an orientation that is "not co-planar" with the plane defined by the tray 36 when the tray is in a non-pivoted position, i.e. the first planar orientation. In one application, the tray 36 of the drawer 26 is oriented in a generally horizontal orientation, as shown in FIG. 3. The tray 36 can be selectively pivoted to a non-horizontal orientation, when the drawer is in the open position, to provide access to the cable management elements 60 mounted on the tray.

Figure 5:
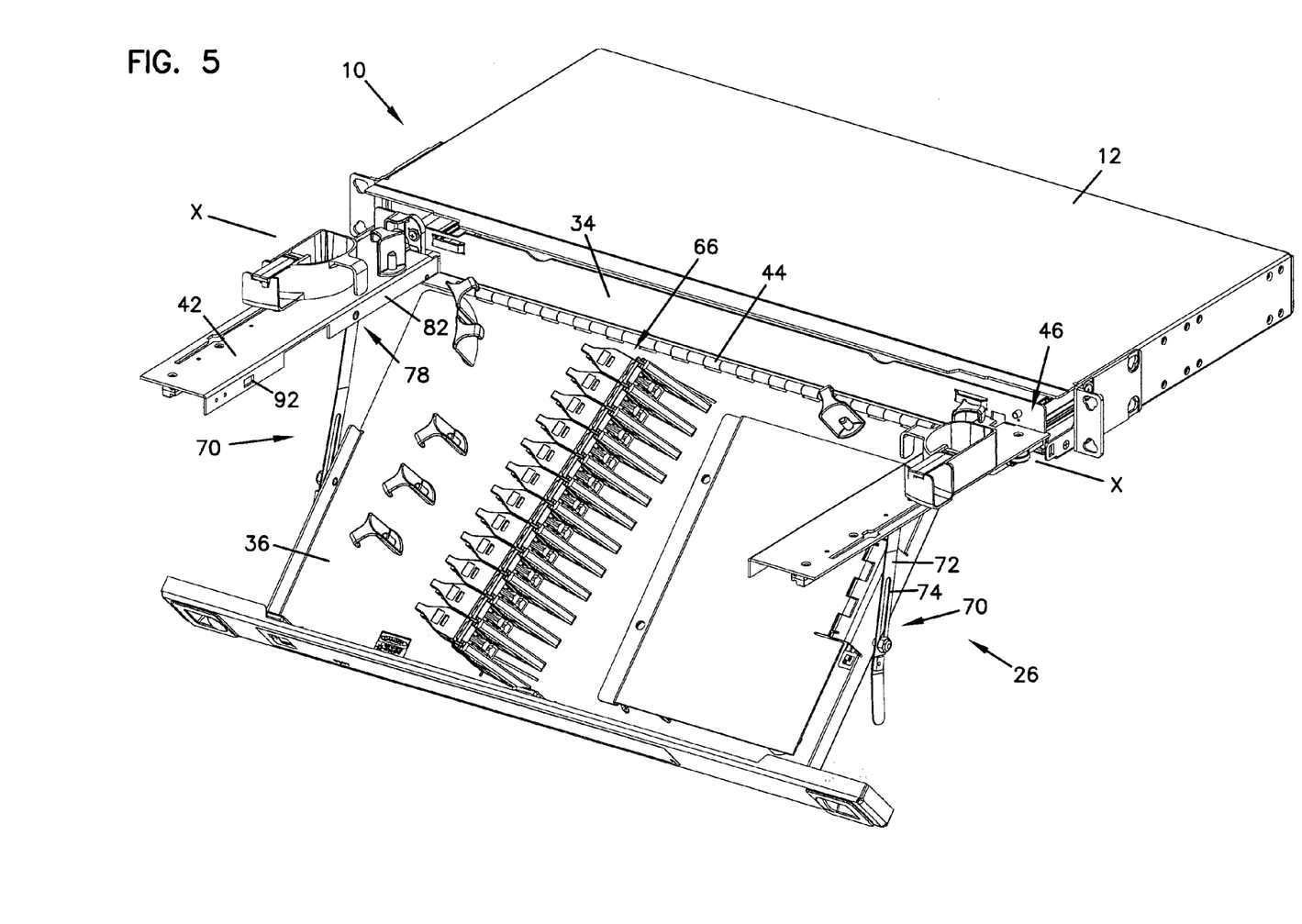
FIG. 5 is a front perspective view of the cable management panel of FIG. 4.

Referring now to FIGS. 4 and 5, the tray 36 is constructed to selectively hinge or pivot about an axis X-X (FIG. 5), as represented by arrow A (FIG. 4). A hinge or pivot mechanism 44 (FIG. 5) that connects the tray 36 to the rear 34 of the drawer defines the axis X-X. In the illustrated embodiment, the hinge 44 is arranged such that tray 36 pivots in a direction away from the frame 46 (e.g., the side plates 42) of the drawer 26. The pivoting tray 36 provides adaptable access to, for example, the connector holders 66 or connector locations, or other elements 60, mounted on the tray.

Referring still to FIGS. 4 and 5, the drawer 26 of the cable management panel 10 includes a connection arrangement 70 that limits the pivotal movement of the tray 36 relative to the frame 46 of the drawer 26. In the illustrated embodiment, the connection arrangement 70 is a pin and slide connection that releaseably locks the tray 36 in both the non-pivoted position (FIG. 3) and a pivoted position (FIG. 4).

Figure 7:
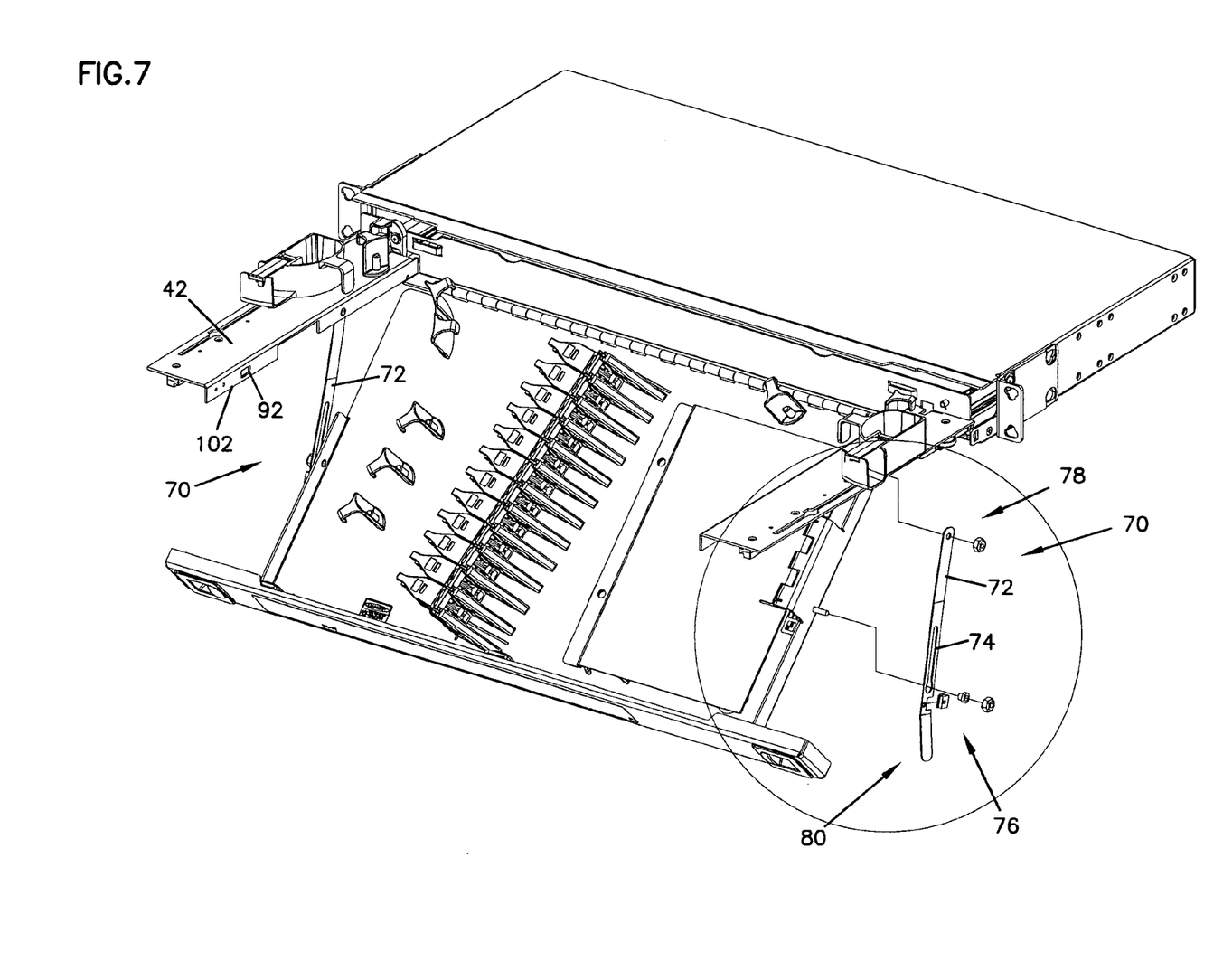
FIG. 7 is a partially exploded, front perspective view of the cable management panel of FIG. 5.
Figure 8:
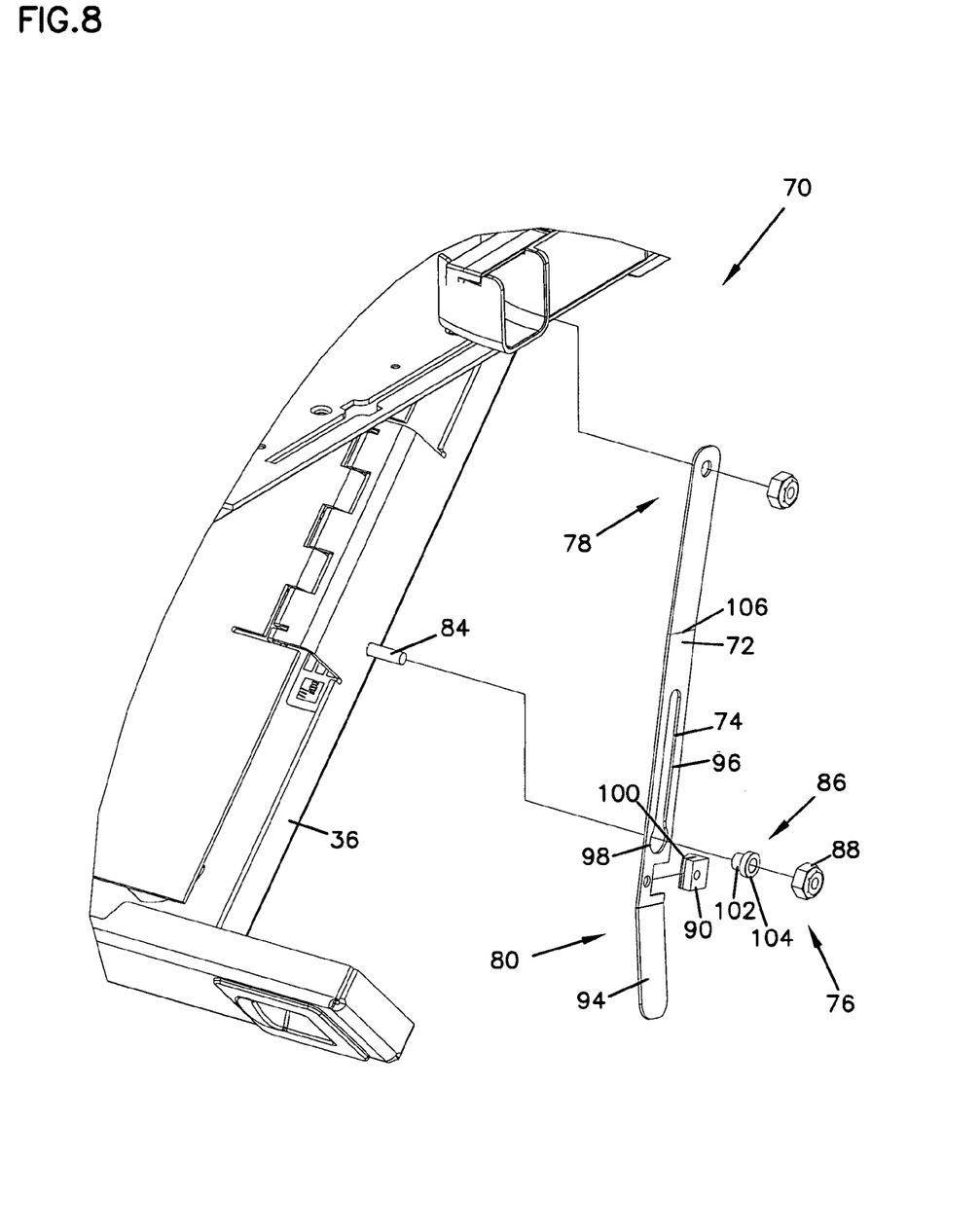
FIG. 8 is an enlarged detail view of FIG. 7.

Referring to FIGS. 7 and 8, the connection arrangement 70 generally includes a linkage or lever arm 72 and a pin assembly 76. The lever arm 72 has a first end 78 and a second end 80. As shown in FIG. 6, the first end 78 of the lever arm 72 is pivotally attached to a flange 82 of the side plate 42 of the drawer 26 (see also FIG. 5). The lever arm 72 is also slidably attached to the tray 36 adjacent to the second end 80 of the arm. That is, the lever arm 72 defines a slide or slot 74 that cooperates with the pin assembly 76 to provides a pin and slot connection between the tray 36 and the drawer frame 46.

Referring now to FIG. 8, the pin assembly 76 of the connection arrangement 70 includes a bushing or plug body 86 having a first smaller diameter portion 102 and a second larger diameter portion 104. The plug body 86 is mounted on a pin 84, which is attached or affixed to the tray 36. A lock nut 88, for example, can be used to secure the plug body 86 to the pin 84.

Still referring to FIG. 8, the connection arrangement 70 also includes a lock piece 90. The lock piece 90 is secured to the second end 80 of the lever arm 72. While in the illustrated embodiment, the lock piece 90 is a separate piece from that of the lever arm 72, it is contemplated that the lock piece can be an integral construction of the lever arm. In use, the pin assembly 76 functions to releaseably lock the tray 36 in the pivoted position, while the lock piece 90 functions to releaseably lock the tray 36 in the non-pivoted position.

In the illustrated embodiment, the lever arm 72 of the connection arrangement 70 is flexibly constructed. The lever arm 72 can be constructed of spring steel, for example, or in the alternative, can be of a molded construction. The slot 74 of the lever arm 72 has a slide portion 96 and an end portion 98. The slide portion 96 of the slot 74 corresponds in size to the smaller diameter portion 102 of the plug body 86 of the pin assembly 76. The end portion 98 of the slot 74 corresponds in size to the larger diameter portion 104 of the plug body 86.

In the illustrated embodiment, the second end 80 of the lever arm 72 is a biased end having a formed angular construction that acts as a leaf-type spring. In one embodiment, the lever arm 72 is angled in a region 106 at an approximate 2 degree offset from the first end 78 of the arm.

In FIG. 9, the drawer 26 is shown in the open position with the tray 36 in the non-pivoted position. The tray 36 is locked in this non-pivoted position via the lock piece 90. In particular, the lock piece 90 engages a corresponding aperture or hole 92 (see also FIG. 5) formed in the flange 82 of the side plate 42 to lock the tray 36 in the non-pivoted position. In the position shown in FIG. 9, the biased end 80 of the lever arm 72 is flexed inward toward the tray 36 of the drawer 26, and retained by the larger diameter portion 104 (FIG. 8) of the pin assembly 76. That is, in the position shown, the biased end 80 of the lever arm 72 is squeezed or moved inward toward the tray 36, as only the smaller portion diameter 102 of the pin assembly 76 fits within the slide portion 96 of the slot 74. The larger diameter portion 104 of the pin assembly prevents the biased end 80 from springing back or moving outward from the tray 36. The lock piece 90 at the biased end 80 of the lever arm 72 is thereby also retained in position, i.e., in engagement with the hole 92 so that the tray 36 remains locked in the non-pivoted position.

The flexible construction of the lever arm 72, however, permits a technician to release the tray 36 from the locked non-pivoted position by flexing the lever arm 72 outward from the tray 36. The lever arm is, in essence, flexed around the larger diameter portion 104 of the pin assembly 76 in a direction away from the flange 82 of the side plate 42. An angled tab 94 is provided at the second end 80 of the arm to assist the technician in grasping and flexing the lever arm. The outward flexure of the lever arm 72 disengages the lock piece 90 from the aperture 92.

When the lock piece 90 is disengaged from the aperture 92, the tray 36 can be pivoted to the pivoted position shown in FIG. 5. While pivoting the tray 36, the smaller diameter portion 102 of the plug body 86 slides within the slide portion 96 of the slot 74. Pivoting motion of the tray 36 is limited at a point where the pin assembly 76 seats within the end portion 98 of the slot 74. In some embodiments, the connection arrangement 70 can be designed to permit the tray 36 to pivot between about 0 degrees and 60 degrees relative to the non-pivoted position. In the illustrated embodiment, the tray 36 pivots approximately 45 degrees relative to the non-pivoted position.

When the tray reaches the pivoted position, the tray 36 automatically locks into place. That is, in the pivoted position, the biased end 80 of the lever arm 72 is no longer constrained by the plug body 86. Instead, as shown in FIG. 6, the end portion 98 of the slot 74 now moves laterally outward to position about or engage the larger diameter 104 of the plug body. The lateral outward movement is caused by the biased construction of the flexible arm. Because the slide portion 96 of the slot 74 is sized to receive only the smaller diameter portion 102 of the pin assembly 76, the tray 36 is thereby locked in the pivoted position. This is desirable during installation and maintenance procedures as the technician will be, for example, pulling on cables attached to the tray.

Figure 12:
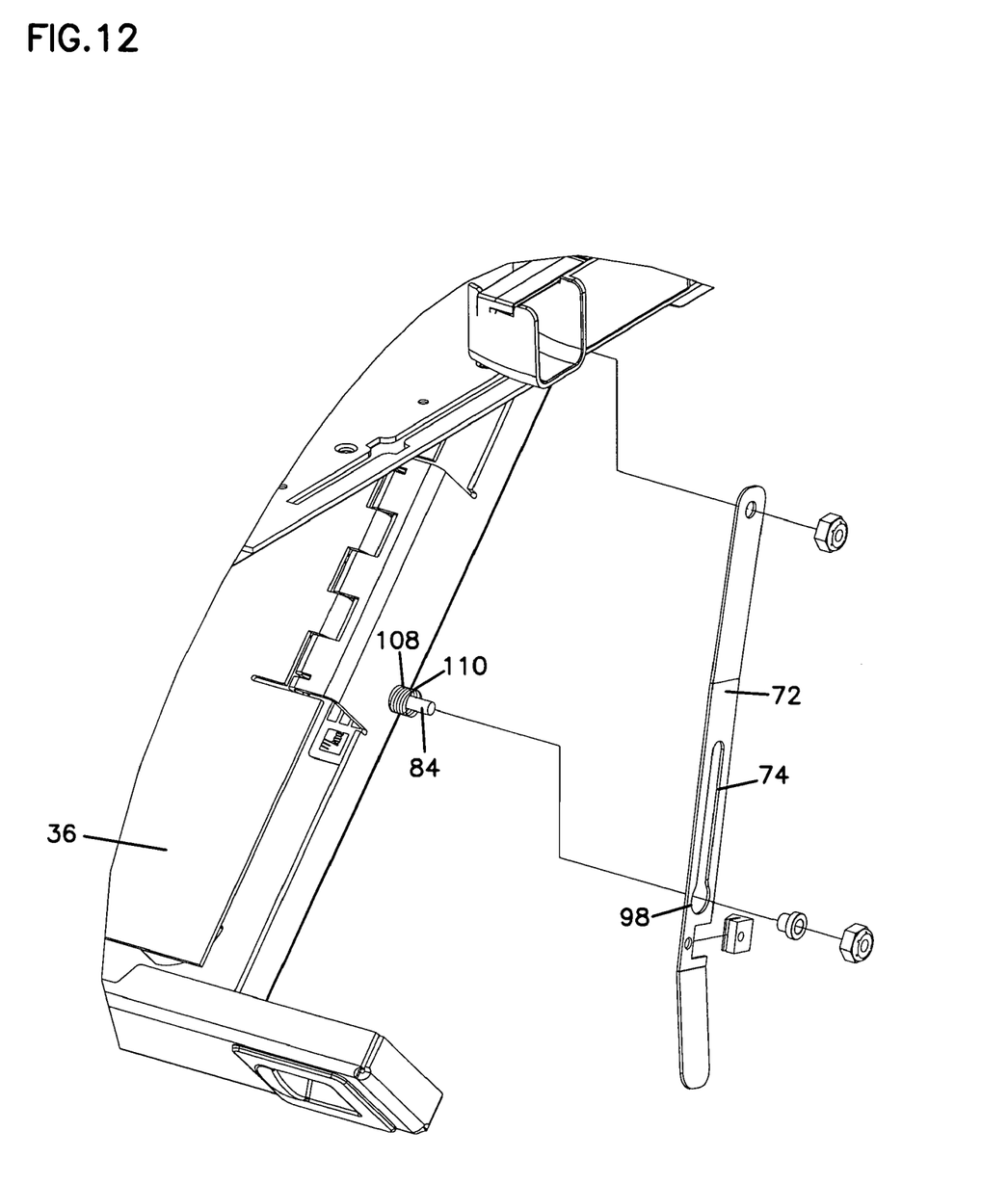
FIG. 12 is an enlarged detail view of FIG. 7, schematically representing an alternative biasing arrangement of the cable management panel.

In an alternative embodiment, the tray 36 can automatically lock into the pivoted position via a spring assembly. For example, as schematically represented in FIG. 12, the end portion 98 of the slot 74 of the lever arm 72 can be biased outward by a spring 108. In this embodiment, the spring 108 is retained about the pin body 84 attached to the tray 36; and a washer 110 is positioned between the spring 108 and the lever arm 72. The spring 108 can assist in laterally biasing the angled lever arm 72 or can solely provide the biasing force onto a non-angled lever arm.

Referring back to FIGS. 6 and 9, to release the tray from the locked position, the lever arm 72 is simply flexed inward toward the tray 36 such that the slot 74 aligns with the smaller diameter portion 102 of the plug body 86. The smaller diameter portion of the plug body 86 then slides upward within the slide portion 96 of the slot 74 as the tray 36 is pivoted back to the non-pivoted position.

Upon returning the tray 36 to the non-pivoted position, a ramped surface 100 (see FIGS. 6 and 8) of the lock piece 90 contacts an edge 106 (FIG. 7) of the flange 82 of the side plate 42. The ramped surface 100 acts as a guide to ease the engagement between the side plate 42 and the lever arm 72. As the tray 36 is further pivoted, the lock piece 90 seats within the aperture 92 formed in the flange 82 to automatically lock the tray 36 in the non-pivoted position.

In general, the present cable management panel 10 provides adaptable access to cable management elements protected within the panel. What is meant by adaptable is that the present cable management panel 10 can be used simply as a drawer that slides in and out of the chassis, or can be used by employing the features of the pivoting tray, as described above. The pivoting tray feature is particularly convenient in applications where the panel 10 is stacked upon other panels (as schematically represented in FIG. 4) or mounted above a comfortable working height. With the present panel 10, the technician can more easily access higher mounted panels by simply sliding the drawer out from the chassis 12, and pivoting the drawer bottom or tray 36 downward. In the pivoted position, the cable management elements 60 mounted on the pivoted tray 36 are more easily accessed as the bottom of the drawer 26 (i.e. the tray 36) now faces the technician.

Figure 10:
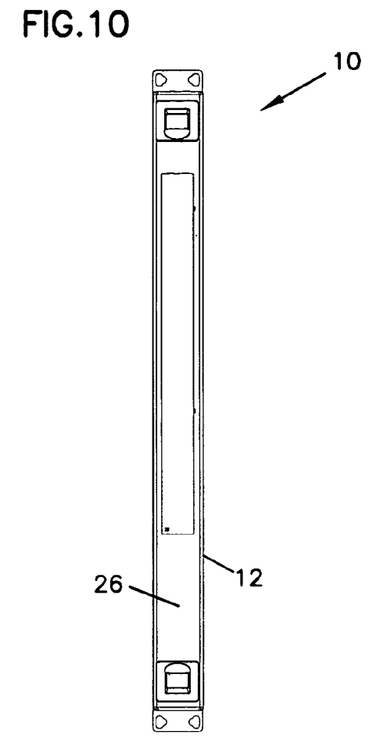
FIG. 10 is front elevation view of the cable management panel of FIG. 1, shown in an application wherein the panel is vertically mounted.
Figure 11:
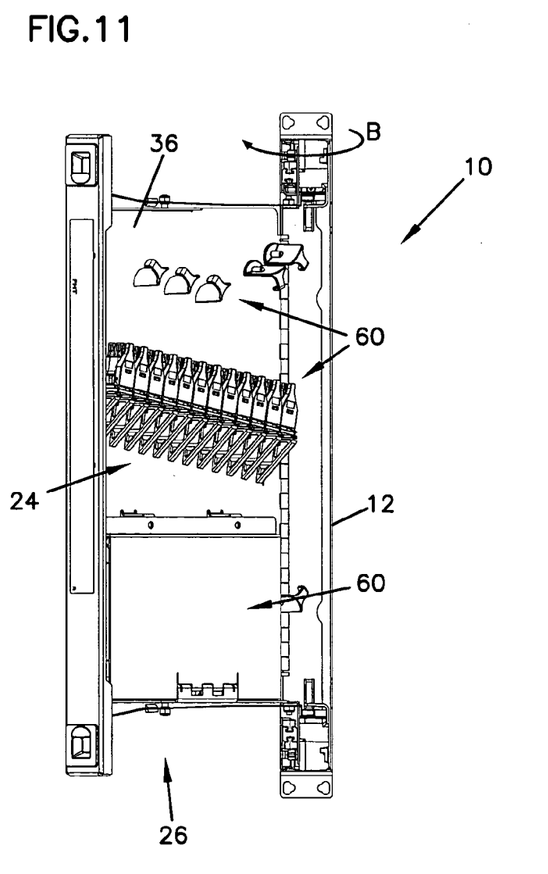
FIG. 11 is a front elevation view of the cable management panel of FIG. 10, shown with the drawer in an open position, and the tray of the drawer in a pivoted position.

Referring now to FIGS. 10 and 11, in an alternative application, the cable management panel 10 can be vertically mounted such that the drawer 26 and tray 36 are oriented in a generally vertical orientation. To access the interior region 24 of the drawer 26, the technician simply slides the drawer 26 out from the chassis 12, and pivots the chassis either to the right, or to the left (as shown by arrow B in FIG. 11), depending upon the vertical orientation of the panel 10. This arrangement is convenient in applications where lateral space, i.e., space located adjacent to the panels, is limited. Instead of standing along side the drawer 26 to face the interior region 24, or twisting sideways to access the elements 60 in the interior region 24, the technician can instead stand in front of the drawer and pivot the vertical tray 36 such that the interior region 24 of the drawer 26 forwardly faces the technician.

The above specification provides a complete description of the invention. Since many embodiments of the invention can be made without departing from the spirit and scope of the invention, certain aspects of the invention reside in the claims hereinafter appended.

What is claimed is:

1. A cable management system, comprising:
   a) a chassis;
   b) a drawer slidably mounted to the chassis, the drawer being moveable between a closed position and an open position, the drawer including:
      i) a drawer frame;
      ii) a tray pivotally mounted to the drawer frame; and
      iii) a front drawer panel mounted at a front of the tray; and
   c) cable management devices mounted on the tray;

d) wherein access to the cable management devices is provided by:
 i) sliding the drawer from the closed position to the open position; and
 ii) pivoting the tray of the drawer relative to the drawer frame from a first planar orientation to a second non-planar orientation; and
e) a connection arrangement coupled between the tray and the drawer frame, the connection arrangement limiting the pivotal movement of the tray.

2. The cable management panel of claim 1, wherein the first planar orientation is a generally horizontal orientation.

3. The cable management panel of claim 1, wherein the first planar orientation is a generally vertical orientation, the second non-planar orientation being a vertical orientation that is not co-planar with the first planar orientation.

4. The cable management panel of claim 1, wherein the drawer has a depth extending between a front and a rear, the tray of the drawer having a tray depth that extends a majority of the depth of the drawer.

5. The cable management panel of claim 1, wherein the tray is interconnected to the drawer frame by a hinge.

6. The cable management panel of claim 1, wherein the connection arrangement locks the tray in both the first planar orientation and the second non-planar orientation.

7. The cable management panel of claim 6, wherein the connection arrangement includes a pin and slot connection.

8. The cable management panel of claim 7, wherein the connection arrangement includes a lever arm defining a slot and a pin assembly, the pin assembly having different first and second diameters, the slot including a slide portion having a size corresponding to the first diameter of the pin assembly, and an end portion having a size corresponding to the second diameter of the pin assembly.

9. The cable management panel of claim 8, wherein the end portion positions about the second diameter of the pin assembly when the tray is pivoted to the second non-planar orientation, thereby locking the tray in the second non-planar orientation.

10. The cable management panel of claim 9, wherein the lever arm is a flexible lever arm having a biased end that positions the end portion of the slot about the second diameter of the pin assembly automatically.

11. The cable management panel of claim 6, wherein the connection arrangement includes a lock piece affixed to a flexible lever arm, the lock piece being arranged to engage a corresponding aperture formed in the drawer frame to lock the tray in the first planar orientation.

12. A cable management panel, comprising:
a) a chassis;
b) a drawer mounted to the chassis, the drawer being configured to slide between a closed position and an open position relative to the chassis, the drawer having a front, a rear, opposite sides, and a bottom; and
c) a plurality of connector holders mounted to the bottom of the drawer;
d) wherein the bottom of the drawer selectively pivots from a generally horizontal orientation to a non-horizontal orientation when the drawer is in the open position; and
e) a connection arrangement coupled between the bottom and one of the sides of the drawer, the connection arrangement limiting the pivotal movement of the bottom of the drawer.

13. The cable management panel of claim 12, wherein the front of the drawer is defined by an upright front panel.

14. The cable management panel of claim 12, wherein the bottom of the drawer is interconnected to the rear of the drawer by a hinge.

15. The cable management panel of claim 12, wherein the connection arrangement locks the bottom of the drawer in both the generally horizontal orientation and the non-horizontal orientation.

16. The cable management panel of claim 15, wherein the connection arrangement includes a pin and slot connection.

17. The cable management panel of claim 16, wherein the connection arrangement includes a lever arm defining a slot and a pin assembly, the pin assembly having different first and second diameters, the slot including a slide portion having a size corresponding to the first diameter of the pin assembly, and an end portion having a size corresponding to the second diameter of the pin assembly.

18. The cable management panel of claim 17, wherein the end portion positions about the second diameter of the pin assembly when the bottom of the drawer is pivoted into the non-horizontal orientation, thereby locking the bottom of the drawer in the non-horizontal orientation.

19. The cable management panel of claim 18, wherein the lever arm is a flexible lever arm having a biased end that positions the end portion of the slot about the second diameter of the pin assembly automatically.

20. The cable management panel of claim 15, wherein the connection arrangement includes a lock piece affixed to a flexible lever arm, the lock piece being arranged to engage a corresponding aperture formed in one of the sides of the drawer to lock the bottom of the drawer in the generally horizontal orientation.

21. A cable management panel, comprising:
a) a chassis;
b) a drawer mounted to the chassis, the drawer being configured to slide between a closed position and an open position relative to the chassis, the drawer including a drawer frame and a tray pivotally mounted to the drawer frame; and
c) a connection arrangement coupled between the drawer frame and the tray, the connection arrangement including a pin assembly and a flexible lever arm that defines a slot, the pin assembly being arranged to travel within the slot when the tray is pivoted between a non-pivoted position and a pivoted position;
d) wherein the connection arrangement is constructed to lock the tray in both the pivoted position and the non-pivoted position.

22. The cable management panel of claim 21, wherein the tray is in a generally horizontal orientation when positioned in the non-pivoted position.

23. The cable management panel of claim 21, wherein the tray is in a generally vertical orientation when positioned in the non-pivoted position, the second non-planar orientation being a vertical orientation that is not co-planar with the first planar orientation.

24. The cable management panel of claim 21, wherein the pin assembly includes different first and second diameters, the slot including a slide portion having a size corresponding to the first diameter of the pin assembly, and an end portion having a size corresponding to the second diameter of the pin assembly.

25. The cable management panel of claim 24, wherein the end portion positions about the second diameter of the pin assembly when the tray is pivoted to the pivoted position, thereby locking the tray in the pivoted position.

26. The cable management panel of claim 25, wherein the lever arm is a flexible lever arm having a biased end that positions the end portion of the slot about the second diameter of the pin assembly automatically.

27. The cable management panel of claim 21, wherein the connection arrangement includes a lock piece affixed to the flexible lever arm, the lock piece being arranged to engage a corresponding aperture formed in the drawer frame to lock the tray in the non-pivoted position.

28. The cable management panel of claim 21, wherein the drawer includes a front drawer panel coupled to the tray.

29. The cable management panel of claim 21, wherein the drawer has a depth extending between a front and a rear, the tray of the drawer having a tray depth that extends a majority of the depth of the drawer.

30. The cable management panel of claim 21, wherein the tray is interconnected to the drawer frame by a hinge.

31. A method of accessing components of a cable management panel, the method comprising the steps of:
   a) providing a chassis and a drawer slidably coupled to the chassis, the drawer including a drawer frame, a tray, and a connection arrangement interconnected between the drawer frame and the tray, cable management components being mounted on the tray;
   b) sliding the drawer out from the chassis;
   c) unlocking the tray from a locked non-pivoted position by flexing a lever arm of the connection arrangement in an outward direction from the tray;
   d) pivoting the tray to a pivoted position; and
   e) locking the tray in the pivoted position wherein an end of the lever arm biases in an outward direction to automatically lock the tray in the pivoted position.

32. The method of claim 31, wherein the step of flexing the lever arm to unlock the tray includes disengaging a lock piece attached to the lever arm from an aperture formed in the drawer frame.

33. The method of claim 31, wherein the step of pivoting the tray includes sliding a pin assembly within a slide portion of a slot, the slot being formed in the lever arm.

34. The method of claim 33, wherein the step of pivoting the tray includes pivoting the tray until pivoting motion is stopped by contact between the pin assembly and an end portion of the slot.

35. The method of claim 34, wherein the step of locking the tray includes positioning the end portion of the slot about a diameter of the pin assembly, the diameter being sized larger than the slide portion of the slot.

36. A cable management system, comprising:
   a) a chassis;
   b) a drawer slidably mounted to the chassis, the drawer being moveable between a closed position and an open position, the drawer including:
      i) a drawer frame;
      ii) a tray pivotally mounted to the drawer frame; and
      iii) a front drawer panel mounted at a front of the tray; and
   c) cable management devices mounted on the tray;
   d) wherein access to the cable management devices is provided by:
      i) sliding the drawer from the closed position to the open position; and
      ii) pivoting the tray of the drawer relative to the drawer frame from a first generally vertical orientation to a second generally vertical orientation that is not co-planar with the first vertical orientation.

* * * * *